United States Patent
Arikuma et al.

(10) Patent No.: US 12,160,686 B2
(45) Date of Patent: *Dec. 3, 2024

(54) CAMERA LISTING BASED ON COMPARISON OF IMAGING RANGE COVERAGE INFORMATION TO EVENT-RELATED DATA GENERATED BASED ON CAPTURED IMAGE

(71) Applicant: Cloud Byte LLC., Newark, DE (US)

(72) Inventors: Takeshi Arikuma, Tokyo (JP); Masahiro Tani, Singapore (SG)

(73) Assignee: CLOUD BYTE LLC., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,306

(22) Filed: Apr. 27, 2023

(65) Prior Publication Data
US 2023/0269349 A1    Aug. 24, 2023

Related U.S. Application Data

(63) Continuation of application No. 17/123,737, filed on Dec. 16, 2020, now Pat. No. 11,800,063, which is a (Continued)

(30) Foreign Application Priority Data

Oct. 30, 2014   (SG) .............................. 201407100-0

(51) Int. Cl.
*H04N 7/00*     (2011.01)
*G08B 13/16*    (2006.01)
(Continued)

(52) U.S. Cl.
CPC ......... *H04N 7/181* (2013.01); *G08B 13/1672* (2013.01); *G08B 13/19602* (2013.01); (Continued)

(58) Field of Classification Search
CPC ...... H04N 7/181; H04N 7/18; G08B 13/1672; G08B 13/19602; G08B 25/08; G06V 20/52
See application file for complete search history.

(56) References Cited

U.S. PATENT DOCUMENTS 5,671,009 A    9/1997  Chun
7,522,186 B2   4/2009  Arpa et al.
(Continued)

FOREIGN PATENT DOCUMENTS

EP   2725552 A1     4/2014
JP   2002092751 A   3/2002  ............. H04N 5/525
(Continued)

OTHER PUBLICATIONS

International Search Report for PCT Application No. PCT/JP2015/005419, mailed on Jan. 19, 2016.
(Continued)

*Primary Examiner* — Frank F Huang
(74) *Attorney, Agent, or Firm* — Sughrue Mion, PLLC

(57) ABSTRACT

Event-related data based on an image that has been captured is generated. Coverage information relating to imaging range is compared to the event-related data. The cameras that can capture an image of the event, based on a comparing result, are listed so that an operator can select one of the listed cameras.

20 Claims, 16 Drawing Sheets

Related U.S. Application Data continuation of application No. 16/295,150, filed on Mar. 7, 2019, now Pat. No. 10,893,240, which is a continuation of application No. 15/519,271, filed as application No. PCT/JP2015/005419 on Oct. 28, 2015, now Pat. No. 10,362,274.

(51) Int. Cl.
  *G08B 13/196* (2006.01)
  *G08B 25/08* (2006.01)
  *H04N 7/18* (2006.01)
  *G06V 20/52* (2022.01)

(52) U.S. Cl.
  CPC ............. *G08B 25/08* (2013.01); *H04N 7/18* (2013.01); *G06V 20/52* (2022.01)

(56) References Cited

U.S. PATENT DOCUMENTS

| | | | |
|---|---|---|---|
| 2002/0194414 A1 | 12/2002 | Bateman | G06F 1/1632 710/303 |
| 2004/0100376 A1 | 5/2004 | Lye et al. | |
| 2005/0134695 A1 | 6/2005 | Deshpande | G08B 13/19656 348/E7.086 |
| 2007/0242066 A1 | 10/2007 | Levy Rosenthal | H04N 5/272 345/419 |
| 2008/0010262 A1 | 1/2008 | Frank | |
| 2008/0098068 A1 | 4/2008 | Ebata et al. | |
| 2008/0143820 A1 | 6/2008 | Peterson | G06T 11/60 348/E7.001 |
| 2008/0198231 A1 | 8/2008 | Ozdemir | G08B 13/19645 348/E7.086 |
| 2008/0274798 A1 | 11/2008 | Walker | G07F 17/3237 463/43 |
| 2009/0122143 A1 | 5/2009 | Latham et al. | |
| 2009/0122144 A1 | 5/2009 | Latham et al. | |
| 2009/0125981 A1 | 5/2009 | Krischer | G08B 13/19645 726/3 |
| 2009/0167857 A1 | 7/2009 | Matsuda et al. | |
| 2009/0306484 A1 | 12/2009 | Kurtz et al. | |
| 2010/0002071 A1 | 1/2010 | Ahiska | |
| 2010/0002074 A1 | 1/2010 | Niem et al. | |
| 2010/0214408 A1 | 8/2010 | McClure et al. | |
| 2010/0214417 A1 | 8/2010 | Gennari et al. | |
| 2011/0234750 A1 | 9/2011 | Lai | G03B 37/04 348/E7.001 |
| 2011/0261203 A1 | 10/2011 | Mupkala et al. | |
| 2012/0206606 A1 | 8/2012 | Marchese | |
| 2012/0249957 A1 | 10/2012 | Shibata | A61B 3/0025 351/206 |
| 2012/0274776 A1 | 11/2012 | Gupta et al. | |
| 2012/0303312 A1 | 11/2012 | Yun | |
| 2012/0327246 A1 | 12/2012 | Senior et al. | |
| 2013/0022948 A1 | 1/2013 | Angell et al. | |
| 2013/0176432 A1 | 7/2013 | Gupta et al. | |
| 2013/0182066 A1 | 7/2013 | Ishimoto | E02F 9/261 348/38 |
| 2013/0265405 A1 | 10/2013 | Brumley et al. | |
| 2014/0092120 A1 | 4/2014 | Demos | |
| 2014/0176663 A1 | 6/2014 | Cutler | G06T 7/11 348/14.07 |
| 2014/0240512 A1 | 8/2014 | Högasten et al. | |
| 2014/0333776 A1 | 11/2014 | Dedeoglu et al. | |
| 2014/0349269 A1 | 11/2014 | Canoy et al. | |
| 2015/0055886 A1 | 2/2015 | Oh et al. | |
| 2015/0116501 A1 | 4/2015 | McCoy | H04N 5/23206 348/169 |
| 2015/0213697 A1 | 7/2015 | Knox et al. | |
| 2015/0244992 A1 | 8/2015 | Buehler | H04N 7/181 348/159 |
| 2015/0347859 A1 | 12/2015 | Dixon | G06V 20/62 382/138 |
| 2016/0127643 A1 | 5/2016 | Huerta | H04N 5/2252 439/8 |
| 2016/0165136 A1 | 6/2016 | Mitsui | H04N 21/816 348/36 |
| 2016/0350826 A1 | 12/2016 | Glasgow | G06Q 30/0619 |
| 2017/0186230 A1 | 6/2017 | Ivers | G06F 3/04842 |
| 2017/0223320 A1 | 8/2017 | Hiranuma | H04N 9/3185 |
| 2017/0225336 A1 | 8/2017 | Deyle | B25J 5/007 |
| 2017/0289504 A1 | 10/2017 | Fridental | G08B 13/19686 |
| 2018/0061010 A1 | 3/2018 | Akselrod | H04N 21/4627 |
| 2018/0068540 A1 | 3/2018 | Romanenko | H04N 19/87 |
| 2018/0158220 A1 | 6/2018 | Van Eeuwijk | G06T 11/60 |
| 2018/0234847 A1 | 8/2018 | Rodriguez | H04W 4/12 |
| 2018/0268240 A1 | 9/2018 | Loce | G06N 7/005 |
| 2019/0050592 A1 | 2/2019 | Grau | G06F 21/629 |
| 2019/0068895 A1 | 2/2019 | Hutz | G06K 9/6274 |
| 2021/0099433 A1 | 4/2021 | Soryal | H04N 21/8166 |

FOREIGN PATENT DOCUMENTS

| | | | |
|---|---|---|---|
| JP | 2002-248463 A | 9/2002 | |
| JP | 2005-012415 A | 1/2005 | |
| JP | 2006332754 A | 12/2006 | ........... B08B 13/194 |
| JP | 2007074217 A | 3/2007 | ............. G08B 25/00 |
| JP | 2007-235969 A | 9/2007 | |
| JP | 2008-099248 A | 4/2008 | |
| JP | 2009-290501 A | 12/2009 | |
| JP | 2010-136295 A | 6/2010 | |
| JP | 2010-183417 A | 8/2010 | |
| JP | 2011-107839 A | 6/2011 | |
| JP | 2013-201756 A | 10/2013 | |
| JP | 2014-146979 A | 8/2014 | |
| WO | 2006/011593 A1 | 2/2006 | |
| WO | 2012/086052 A1 | 6/2012 | |
| WO | 2014/001009 A1 | 1/2014 | |

OTHER PUBLICATIONS

Written Opinion of the International Search Authority for PCT Application No. PCT/JP2015/005419, mailed on Jan. 19, 2016.
Singapore Office Action for SG Application No. 11201703151Q dated on Nov. 2, 2017.
Hsueh et al, Abnormal event detection using bayesian networks at a smart home (Year: 2015).
US NOA and PTO-892 for U.S. Appl. No. 15/519,271 dated on Mar. 13, 2019.
Japanese Office Action for JP Application No. 2017-520996 mailed on Nov. 12, 2019 with English Translation.
US Office Action for U.S. Appl. No. 16/438,628 mailed on Jan. 29, 2020.
Yuan et al. "Unmanned aerial vehicle based forest fire monitoring and detection using image processing technique (Year: 2016)", China.
Kandil et al. "Fire detection using a dynamically developed neural network (Year: 2010)", Croatia.
US NOA for U.S. Appl. No. 16/438,628 mailed on Mar. 30, 2020.
Japanese Office Action for JP Application No. 2020-072096 mailed on Mar. 2, 2021 with English Translation.
JP Office Action for JP Application No. 2021-206613, mailed on Nov. 29, 2022 with English Translation.
Japanese Office Action dated Jun. 11, 2024 in Application No. 2023-138974.
Communication dated Oct. 8, 2024, issued in Japanese Application No. 2023-138974.

CAMERA LISTING BASED ON COMPARISON OF IMAGING RANGE COVERAGE INFORMATION TO EVENT-RELATED DATA GENERATED BASED ON CAPTURED IMAGE

The present application is a Continuation application of Ser. No. 17/123,737 filed on Dec. 16, 2020, which is a Continuation application of Ser. No. 16/295,150 filed on Mar. 7, 2019, which issued as U.S. Pat. No. 10,893,240, which is a Continuation application of Ser. No. 15/519,271 filed on Apr. 14, 2017, which issued as U.S. Pat. No. 10,362,274, which is a National Stage Entry of PCT/JP2015/005419 filed on Oct. 28, 2015, which claims priority from Singapore Patent Application 201407100-0 filed on Oct. 30, 2014, the contents of all of which are incorporated herein by reference, in their entirety.

TECHNICAL FIELD

The present invention relates to a monitoring system, a monitoring method and program for visual and/or audio. More specifically, the present invention relates to monitoring systems for detecting and reacting to abnormal events by real-time analysis technologies.

BACKGROUND ART

The real-time analysis technologies such as video analysis and audio analysis can detect abnormal events in the field. Generally, operators manually analyze data from sensors located near an event to become aware of a situation or to learn details of an event. The operators manually select related information from periodic or continuous sensor data to become more aware of the situation or to learn more details of the event. This procedure leads to delay in the operators' reaction to abnormal events because the analysis results and the sensor data used for the analysis may be insufficient to make a decision for responding to the event.

SUMMARY OF INVENTION

Technical Problem

What is needed is a system which can automatically select and control sensors to show details of events including views providing a closer look and overviews providing a wider look at the event as it unfolds so that the operators can respond promptly based on the information in the views provided. Furthermore, other desirable features and characteristics will become apparent from the subsequent detailed description and the appended claims, taken in conjunction with the accompanying drawings and this background of the disclosure.

In view of above, a main object of the present invention is to provide a monitoring system and the like that can detect and react to abnormal events in real-time.

Solution to Problem

An exemplary aspect of the present invention is a monitoring system for event related data from a plurality of sensors, including: a receiver that receives the event related data from a plurality of sensors; a coverage analyzer that analyzes predetermined data and the event related data from the receiver; and a sensor selector. The predetermined data includes sensor coverage information. The sensor selector is coupled to the coverage analyzer and selects one or more of the plurality of sensors based on the analysis by the coverage analyzer.

An exemplary aspect of the present invention is a monitoring method for event related data from a plurality of sensors, including: receiving the event related data from a plurality of sensors; analyzing predetermined data and the event related data, the predetermined data including sensor coverage information; and selecting one or more of the plurality of sensors based on the analysis.

An exemplary aspect of the present invention is a non-transitory computer readable recording medium storing program for monitoring event related data from a plurality of sensors, and the program causes a computer to execute processing of: receiving the event related data from a plurality of sensors; analyzing predetermined data and the event related data, the predetermined data including map information and sensor coverage information; and selecting one or more of the plurality of sensors based on the analysis.

Advantageous Effects of Invention

According to the present invention, a monitoring system and the like that can detect and react to abnormal events in real-time can be provided.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various exemplary embodiments and to explain various principles and exemplary advantages in accordance with the present invention. Exemplary features and advantages of the present invention will become apparent from the following detailed description when taken with the accompanying drawings in which.

Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of the present and another exemplary embodiments.

DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description.

Figure 1:
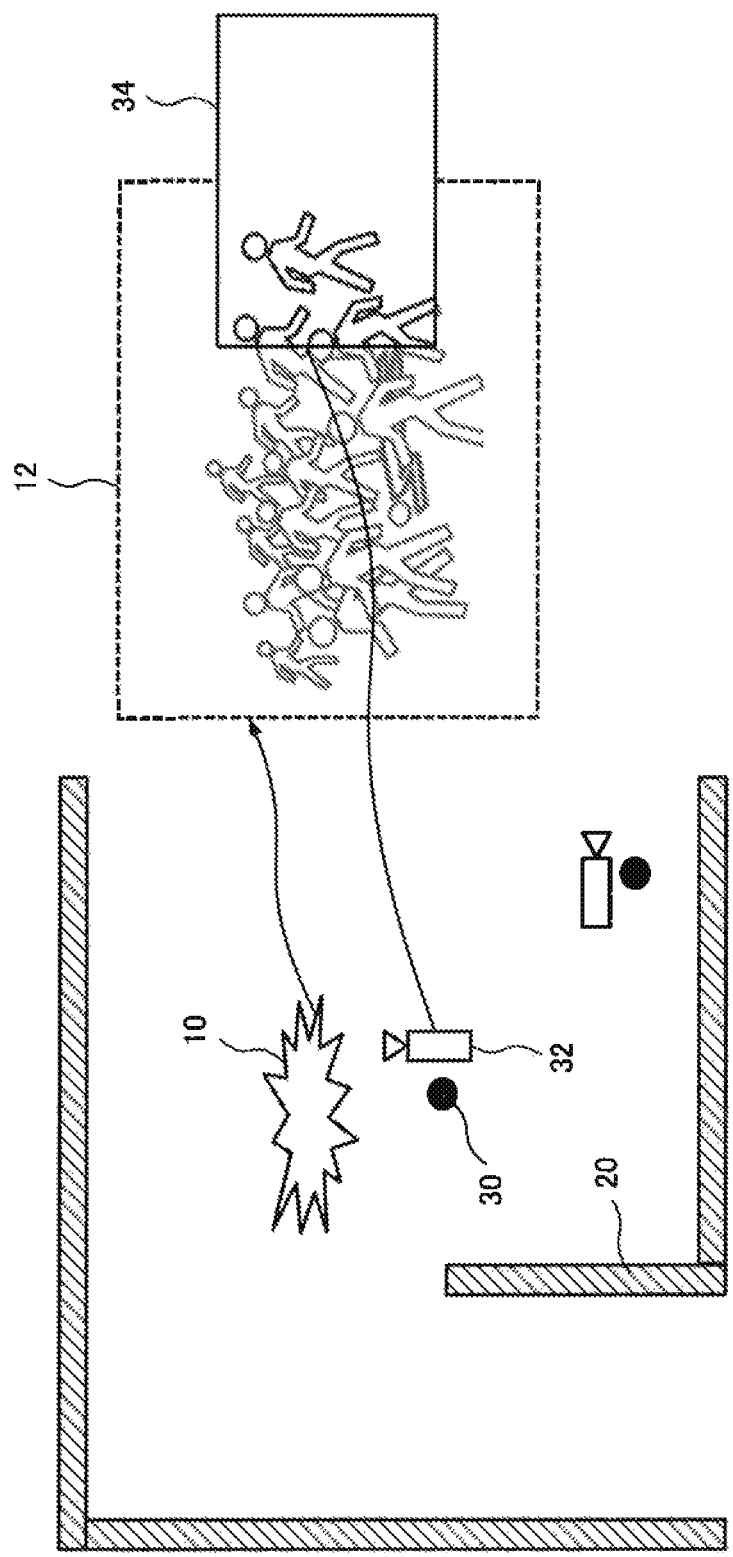
FIG. 1 is a schematic diagram of sensors used with a monitoring system of a Related Art.

Firstly, a basic concept of exemplary embodiments of the present invention is described. Referring to FIG. 1, sensors used with a monitoring system of a Related Art is shown. The system detects an abnormal event location 10 in an event area 12 by a first sensor (Microphone) 30 and selects a camera 32 which is the nearest camera to the abnormal event location 10. However, the nearest camera 32 captures only a part of the abnormal event location 10 and the operators can receive only limited information (information in a camera screen 34) regarding the abnormal event location 10 from the camera 32. In this case, since the nearest camera 32 captures a part of surrounding people instead of people lying on the floor, the operators are not aware a person or persons lying on the floor. The operators may try to learn the situation by manually operating several sensors around the abnormal event location 10. However, it takes time to learn what is happening and respond to the event by e.g. calling a paramedic. In some cases, the delay in response may become fatal.

Figure 2:
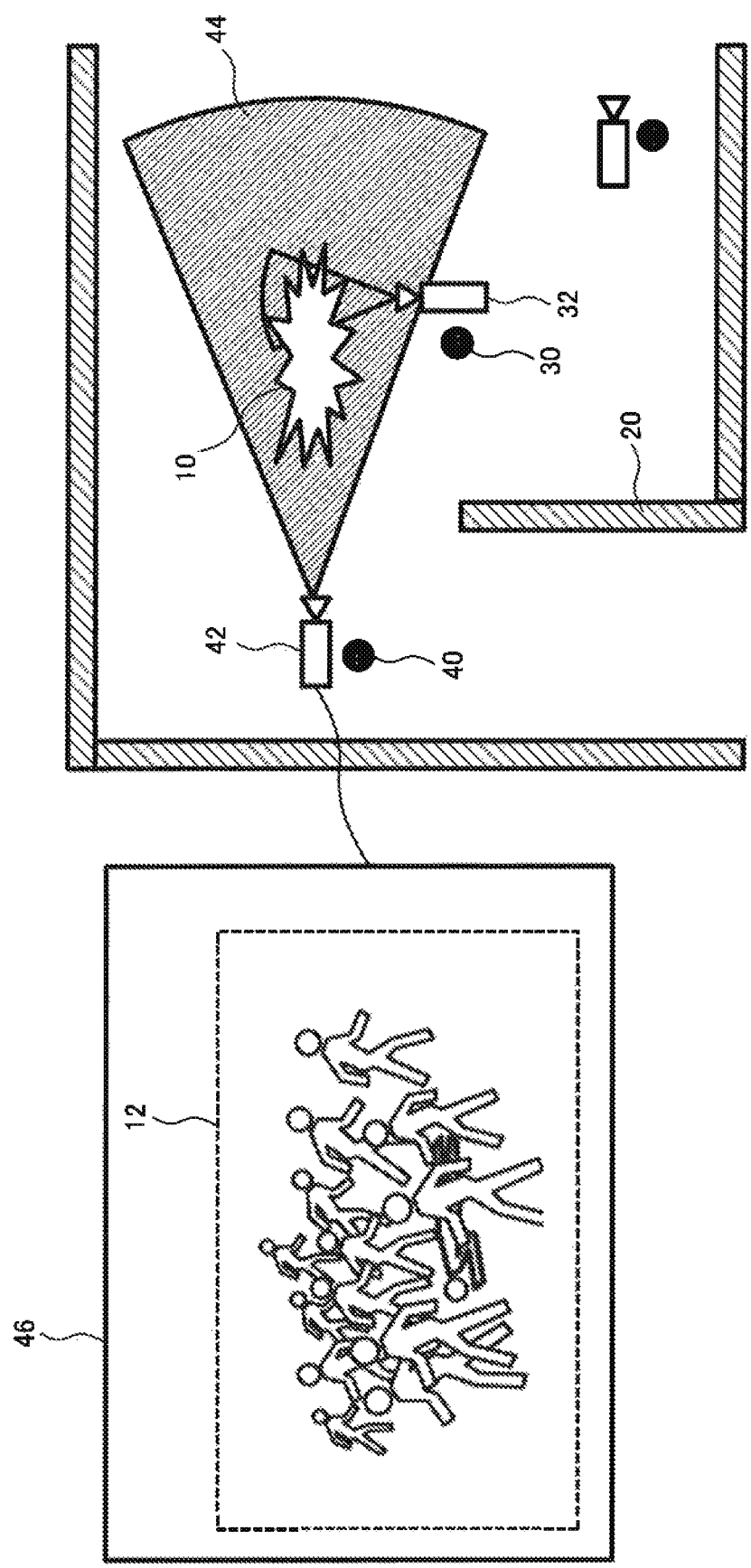
FIG. 2 is a schematic diagram of sensors used with a monitoring system in accordance with the exemplary embodiments of the present invention.

Referring to FIG. 2, sensors used with a monitoring system in accordance with the exemplary embodiments of the present invention is shown. The monitoring system detects the abnormal event location 10 by a first sensor 30 and estimates the abnormal event location 10 in the event area 12. The monitoring system selects other sensors (camera 42 and other sensors) which are located near the abnormal event location 10. The other sensors' combined Field of View (FOV) for directional fixed sensors and/or Field of Regarding (FOR) for non-directional or movable sensors cover the entire event area 12. The monitoring system controls the selected sensors (Microphone 30, Microphone 40 and/or camera 42) to sense the detected abnormal event location 10. In this case, the selected sensor (camera 42) captures an entire event area image (by Camera 42) 46. Then, the operators become aware of the person(s) lying on the floor without manual operation. Since the operators are able to learn and respond to the situation without delay, it may be possible to deal with the situation before it gets fatal.

In accordance with the exemplary embodiments of the present invention, the operators can become aware of the event by learning details of the event with a closer view of the event as well as the overview of the event with a wider view because the monitoring system can select and control sensors as described below. This advantageously enables operators to respond to events promptly.

Figure 3:
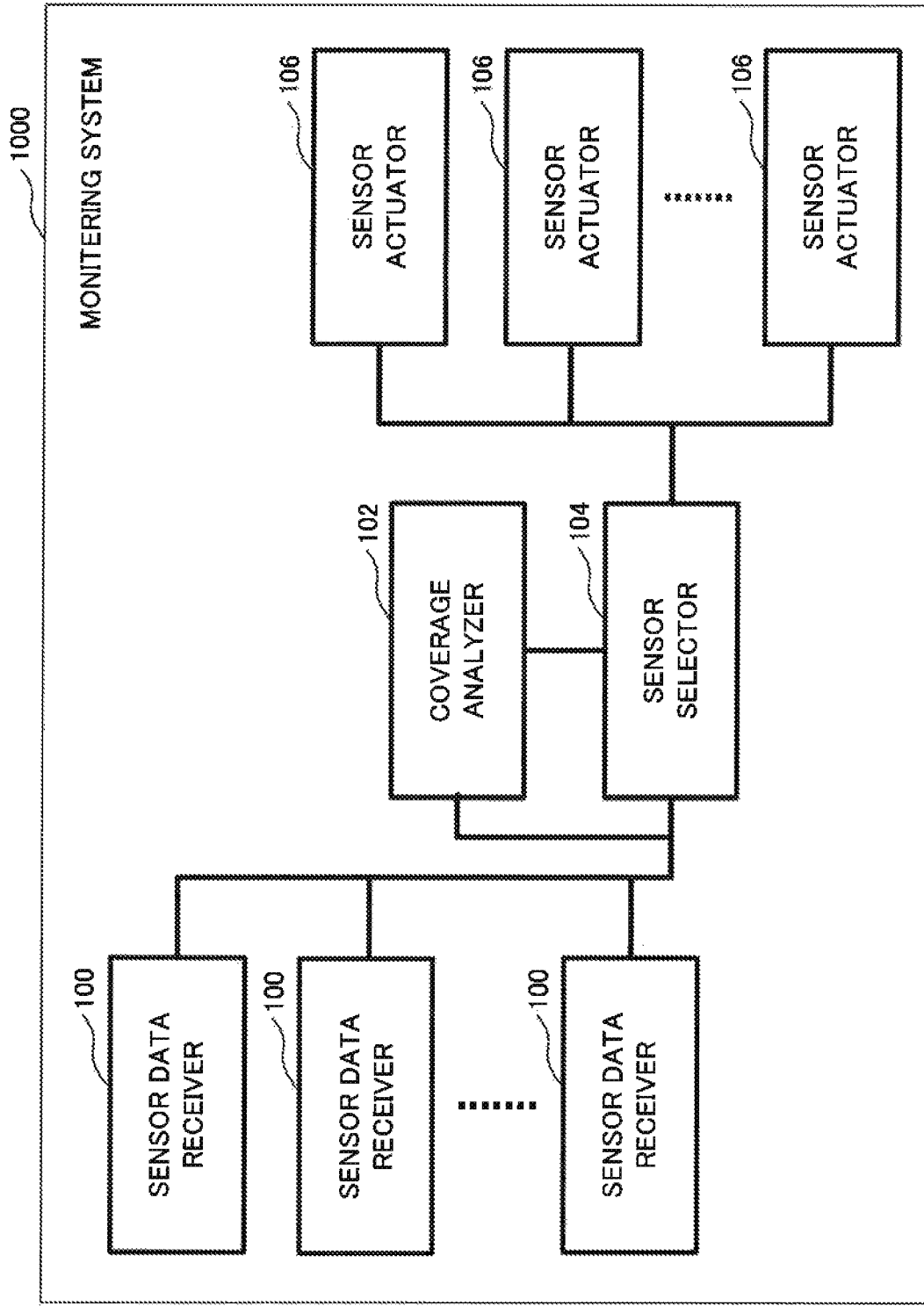
FIG. 3 is a block diagram of a monitoring system in accordance with the exemplary embodiments of the present invention.
Figure 4:
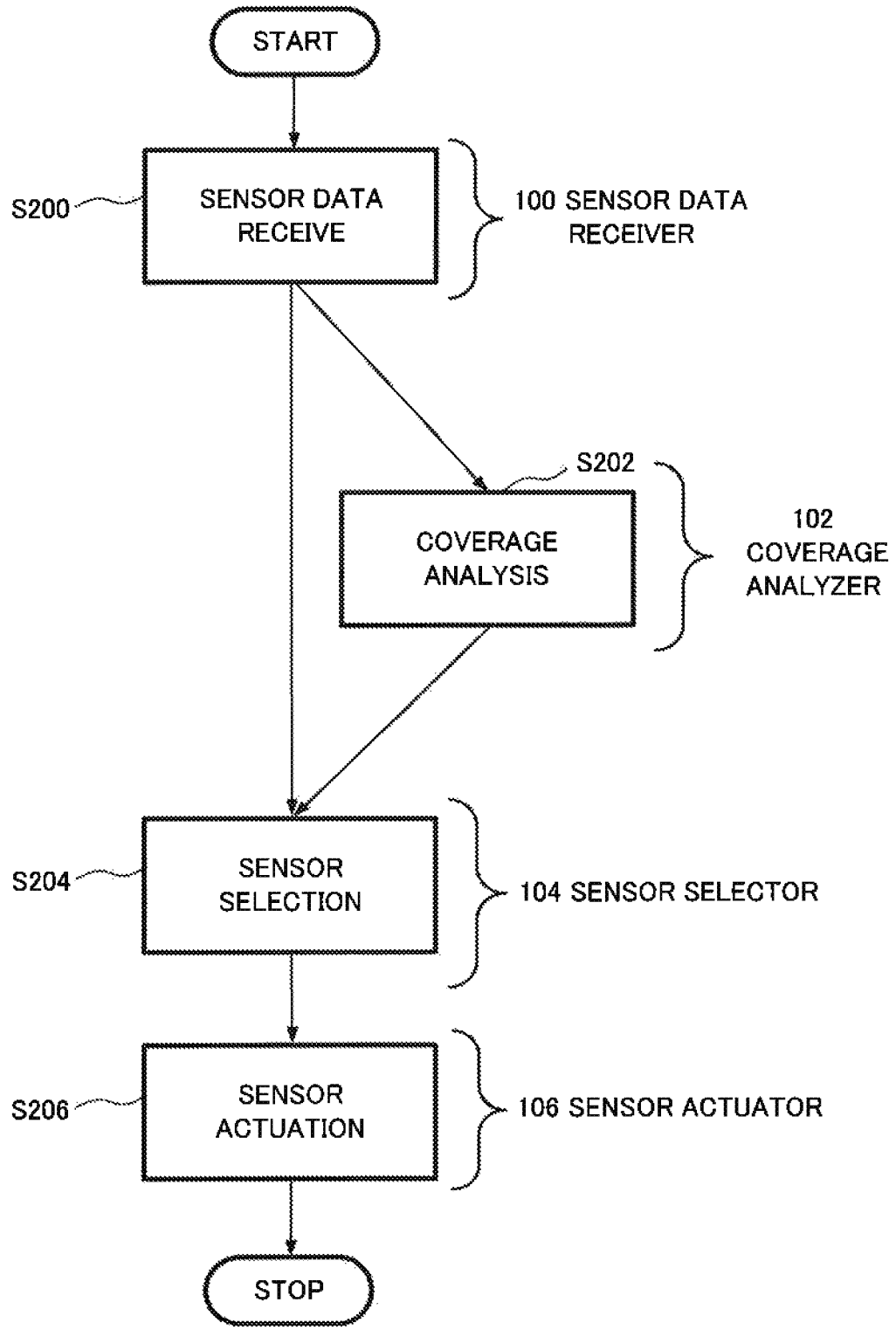
FIG. 4 is a flowchart in accordance with the exemplary embodiments of the present invention.

Referring to FIG. 3 and FIG. 4, a block diagram and a flow chart in accordance with the exemplary embodiments of the present invention is disclosed. The monitoring system 1000 continuously receives (step 200) sensor data from sensors (not shown) at sensor data receivers 100. The sensor data receivers 100 send the received data to a coverage analyzer 102. The coverage analyzer 102 executes a coverage analysis which analyzes the sensor coverage information by comparing the coverage information with the event related data such as size of the event and/or movement of the event. The coverage analyzer 102 identifies the best sensor(s) to observe an abnormal event at the abnormal event location 10 (step 202). A sensor selector 104 selects one or more sensors (the best sensor(s)) based on the coverage analysis (step 204) by the coverage analyzer 102. Sensor actuators 106 actuate (step 206) one or more sensors in response to signals from the sensor selector 104. Thus, it can be seen that the system of FIG. 3 operates in accordance with the method of FIG. 4 to automatically select and actuate the best sensor(s) to observe the abnormal event as it unfolds. In this manner, the operators can advantageously view the unfolding of the event and trigger an appropriate and timely response.

Figure 5:
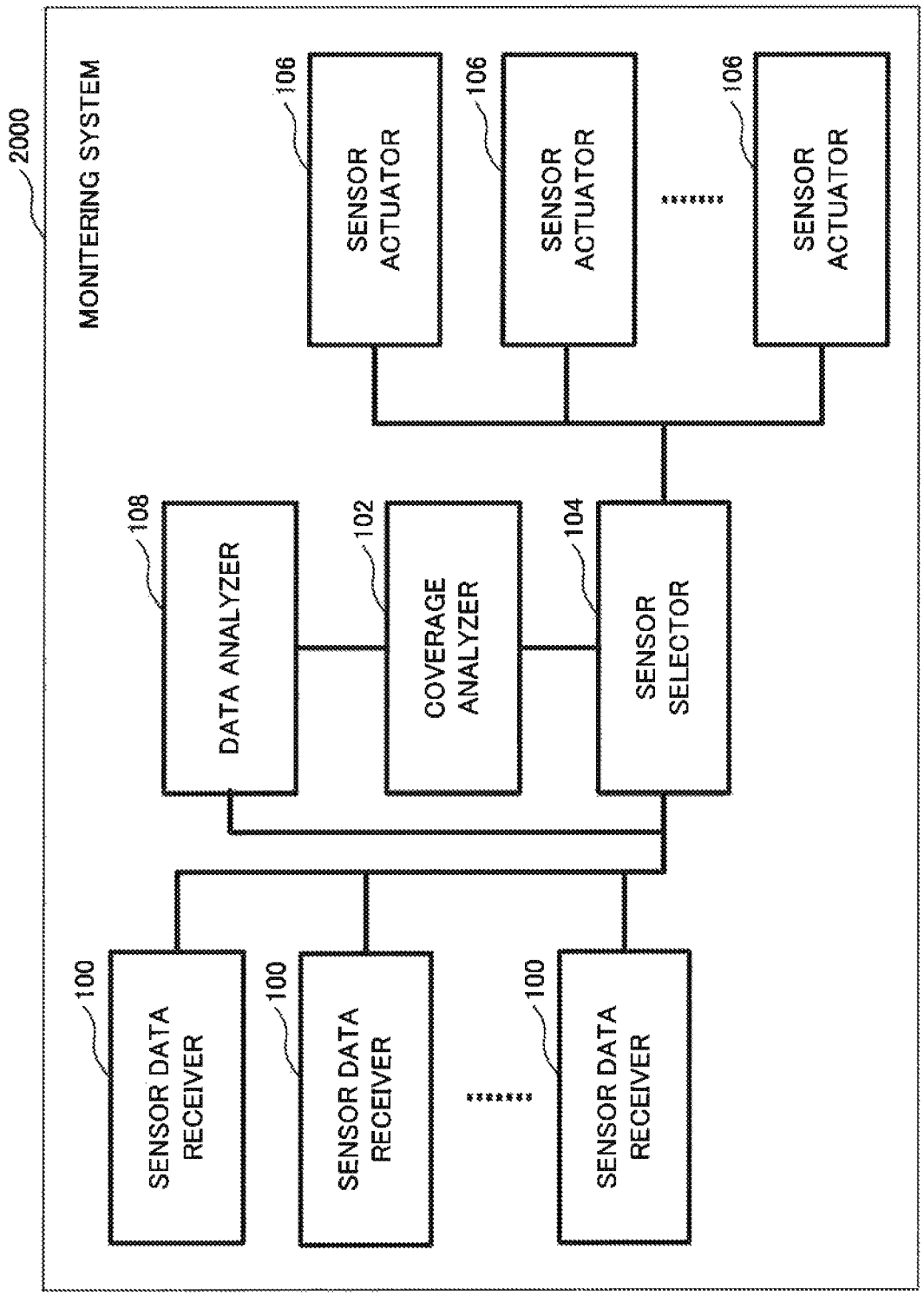
FIG. 5 is a block diagram of a monitoring system in accordance with another embodiment of the present invention.
Figure 6:
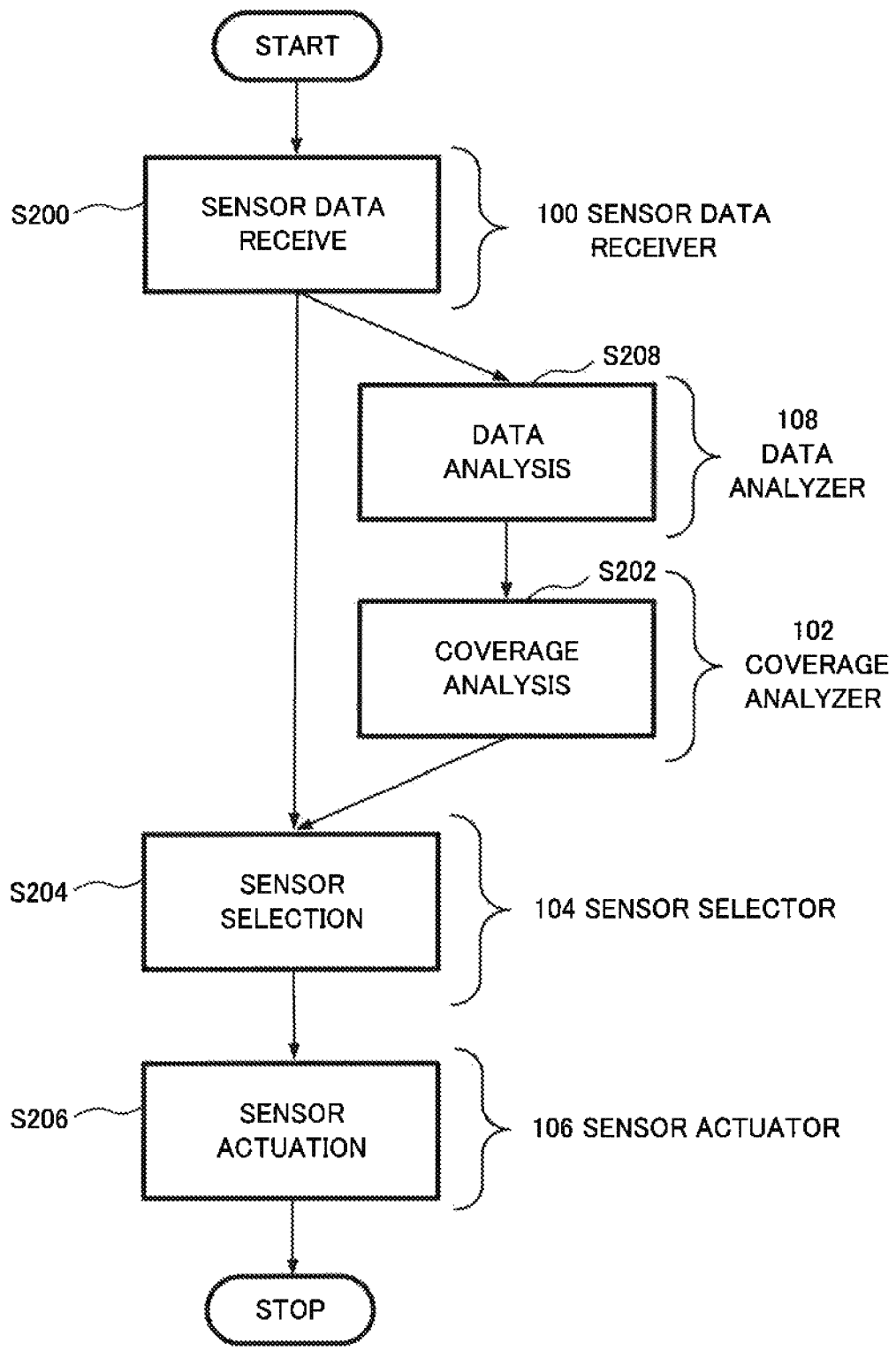
FIG. 6 is a flowchart in accordance with another embodiment of the present invention.

Referring to FIG. 5 and FIG. 6, a block diagram and a flow chart in accordance with another embodiment is disclosed. A monitoring system 2000 in accordance with the another embodiment continuously receives (step 200) sensor data from sensors (not shown) at the sensor data receivers 100 and analyzes the received data (step 208) by a data analyzer 108. When the sensor data receivers 100 send the received data to the data analyzer 108, the data analyzer 108 analyzes the received data to identify event related information; that is, the abnormal event location 10 and size of the event, and forwards this event related information to the coverage analyzer 102 (step 208). In this manner, the data analyzer 108 continuously reviews the received data from the sensor data receivers 100 and, when the data analyzer 108 determines that an event of interest to the operators is occurring, the data analyzer 108 determines the abnormal event location 10 and the size of the event of interest and forwards the event related information to the coverage analyzer 102 to trigger event coverage operation (coverage analysis) of the coverage analyzer 102. The coverage analyzer 102 then executes the coverage analysis and identifies the best sensor(s) to observe the event (step 202) as it unfolds. The sensor selector 104 receives information identifying the best sensor(s) to observe the event and selects the sensor(s) for actuation in response to the information from the coverage analysis (step 204). The sensor actuators 106 actuate the sensor(s) (step 206) so that the operators may advantageously follow the event with the best coverage available from the system.

The coverage analyzer 102 analyzes the coverage of each of the sensors to identify suitable sensor(s) to observe the detected event. The coverage analyzer 102 analyzes the sensor coverage information by comparing the coverage information with the event related data such as size of the event and/or movement of the event. Then, the coverage analyzer 102 sends the result to the sensor selector 104 so that the sensor selector 104 can select a sensor nearest to the detected event which has a Field Of View (FOV) for directional fixed sensors and a Field of Regarding (FOR) for non-directional or movable sensors large enough to capture the event.

The coverage analysis by the coverage analyzer 102 may include analysis based on the type of event. There are several types of events to be monitored and useful information for operators are different for each type of events. The coverage analyzer 102 in accordance with a present embodiment is customized for the type of events and provides useful information for operators for each event.

In one case scenario, the operators may be concerned about abandoned objects in public areas because they may pose a security risk. For example, a system tracking objects at a train station may determine which ones remain stationary and then select a camera which can observe the object closely. In another case scenario, the operators may be concerned about congestion. For monitoring congestion events, a part of an event scene may be insufficient for operators to make a decision and respond promptly. Therefore, a camera which can observe the event from a panoramic view is selected.

The coverage analysis by the coverage analyzer 102 may take into account map information. The map information includes information regarding wall or other space defining structures. In actual situations, coverages of sensors tend to be blocked by various things. The coverage analyzer 102 in accordance with a present embodiment takes into account things such as walls or other space defining structures when determining optimal FOVs and/or FORs.

In one case scenario, there is a wall between the event location and a camera and the camera is not able to capture the event. To provide useful information for operators, the camera which is not able to capture the event due to the wall is excluded from a list of sensor selections and a camera which is able to capture the event is selected. If there is no camera which is able to capture the event area directly, then a microphone which is able to capture the area is selected.

Also, the coverage analysis by the coverage analyzer 102 may include analysis based on the capability of sensor actuators. The sensor actuators 106 are able to change sensor setting, such as pan-tilt-zoom (PTZ), based on the information from the sensor selector 104. Also, the sensor actuators 106 may be able to change a direction of sensors. By taking into account these capabilities of the sensor actuators 106 and the sensors, the coverage of each sensor is identified and the best sensor(s) to capture the event will be identified by the coverage analysis 202 in accordance with the present embodiment.

First Exemplary Embodiment

Figure 7:
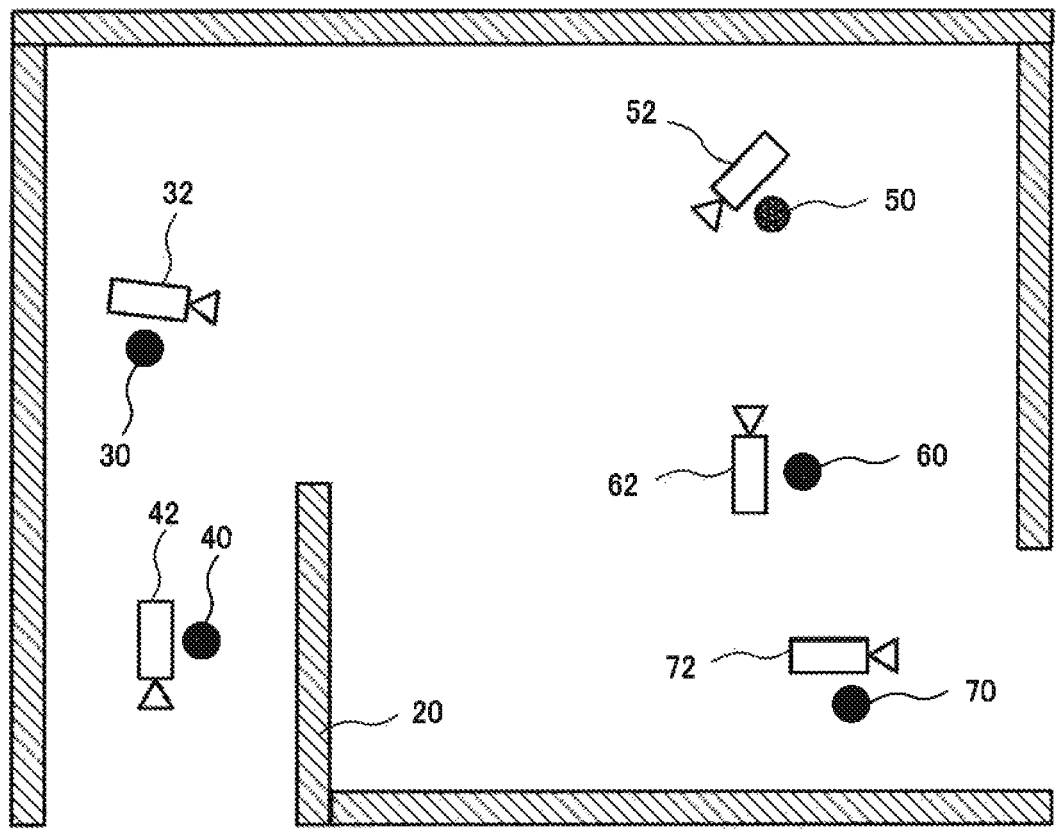
FIG. 7 is a schematic diagram of sensors used with a monitoring system in a first exemplary embodiment of the present invention.

Referring to FIG. 7, a first exemplary embodiment of the present invention is disclosed. In this first embodiment, a monitoring system (monitoring system 2000) selects sensors which are suitable for observing a detected event. Multisensory surveillance devices, such as surveillance cameras with microphones, are placed in a surveillance area. An exemplary camera configuration in the surveillance area is shown as fixed cameras (32, 42, 52, 62 and 72) with microphones (30, 40, 50, 60 and 70). A single sensor device such as a fixed camera without microphone or a microphone by itself may also be used. Sensor data receivers 100 receive the data from these sensor devices and pass the data to a data analyzer 108. The sensor data receivers 100 may process media conversion such as decoding, encoding, transcoding and resolution conversion, if necessary.

The data analyzer 108 analyzes the data from the sensor devices. The data may include an abnormal crowd behavior such as a crowd gathering and scattering detected by a camera. The data may also include an abnormal sound such as screaming or a breaking sound detected by a microphone. The data analyzer 108 may analyze the data detected by a single sensor or multiple sensors. The data analyzer 108 passes the results of the data analysis to the coverage analyzer 102. The data analyzer 108 may pass metadata of the detected event such as location of the event, likelihood of the nature of the event, time of the event, possible event list and possible subsequent event candidates.

Figure 8:
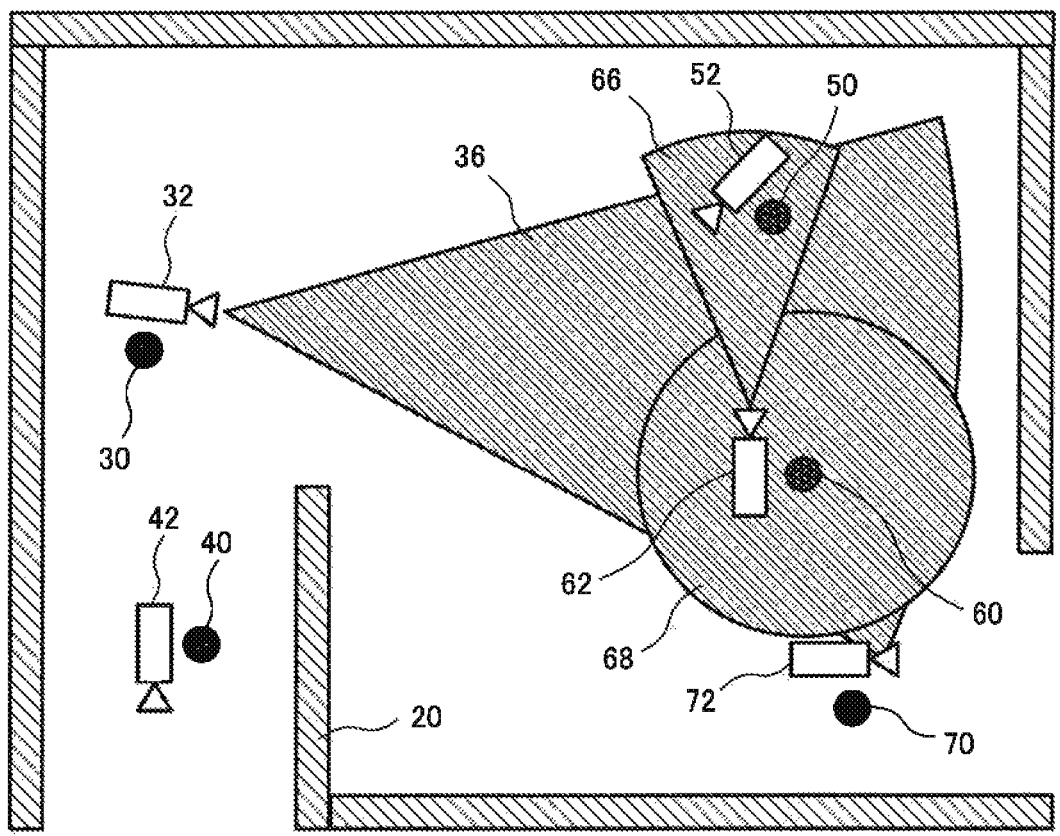
FIG. 8 is a schematic diagram of a first situation of the sensors used with the monitoring system in the first exemplary embodiment of the present invention.

Referring to FIG. 8, a first situation of the sensors used with the monitoring system 2000 of the first exemplary embodiment of the present invention is disclosed. The coverage analyzer 102 identifies sensors which are suitable to observe an event detected by the data analyzer 108. The coverage analyzer 102 identifies sensor coverage information for each sensor such as a field of view (FOV) for directional fixed sensors or a field of regard (FOR) for non-directional or movable sensors. In one example, the coverage analyzer 102 identifies sensors that have FOV or FOR which overlaps with the detected event location. Regarding an event detected by a microphone 60, the coverage analyzer 102 identifies the camera 32 instead of the camera 52 or the camera 62 because a FOV 36 of the camera 32 has the largest overlapping FOV with a FOR 68 of the microphone 60. Also, regarding an event detected by the camera 62, the coverage analyzer 102 identifies the camera 32 instead of the camera 52 because the FOV 36 of the camera 32 has a larger coverage area overlapping with a FOV 66 of the camera 62 in comparison with a FOV of the camera 52.

Figure 9:
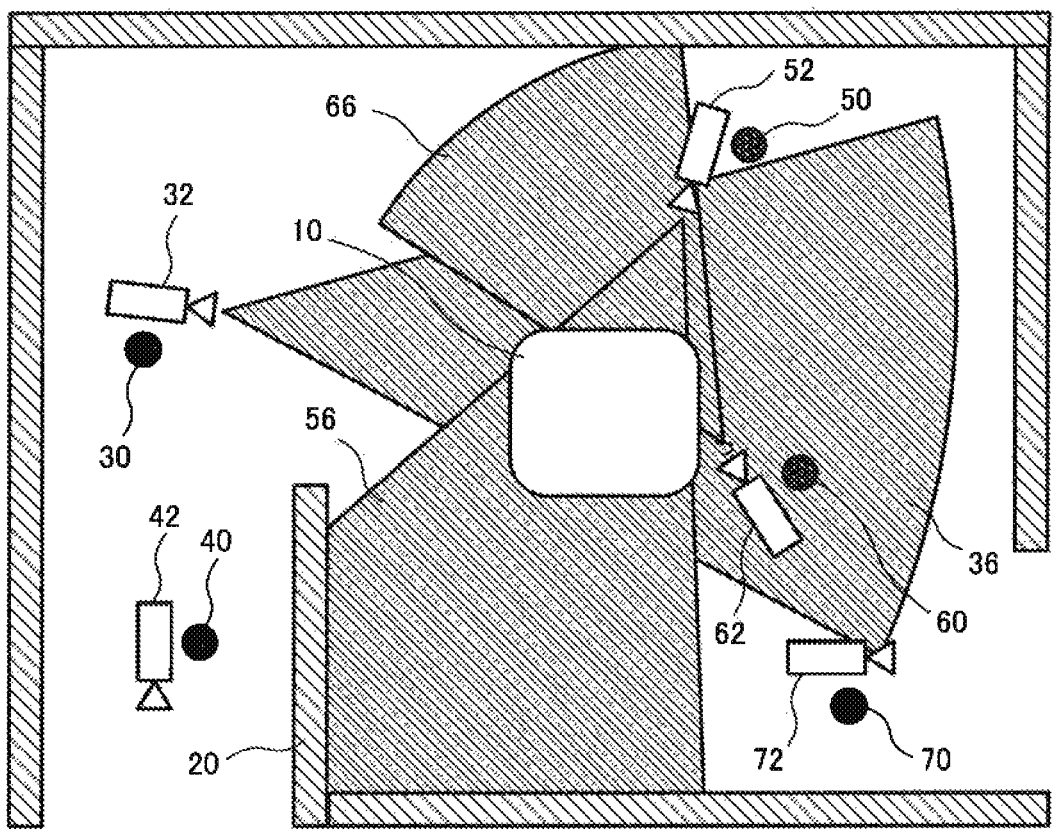
FIG. 9 is a schematic diagram of a second situation of the sensors used with the monitoring system in the first exemplary embodiment of the present invention.

Referring to FIG. 9, a second situation of the first exemplary embodiment of the present invention is disclosed. The coverage analyzer 102 identifies a camera that has the FOV or FOR which covers a size of the event which is estimated by a data analyzer 108. Regarding an event detected by a microphone 60, the coverage analyzer 102 identifies the camera 52 instead of the camera 32 or the camera 62. This is because the FOV 56 of the camera 52 covers the entire estimated event area of the abnormal event location 10 while the FOV of the camera 62 covers the event partially. Also, the camera 52 is closer to the abnormal event location 10 as compared with the camera 32. Therefore, the camera 52 is identified by the coverage analyzer 102.

Figure 10:
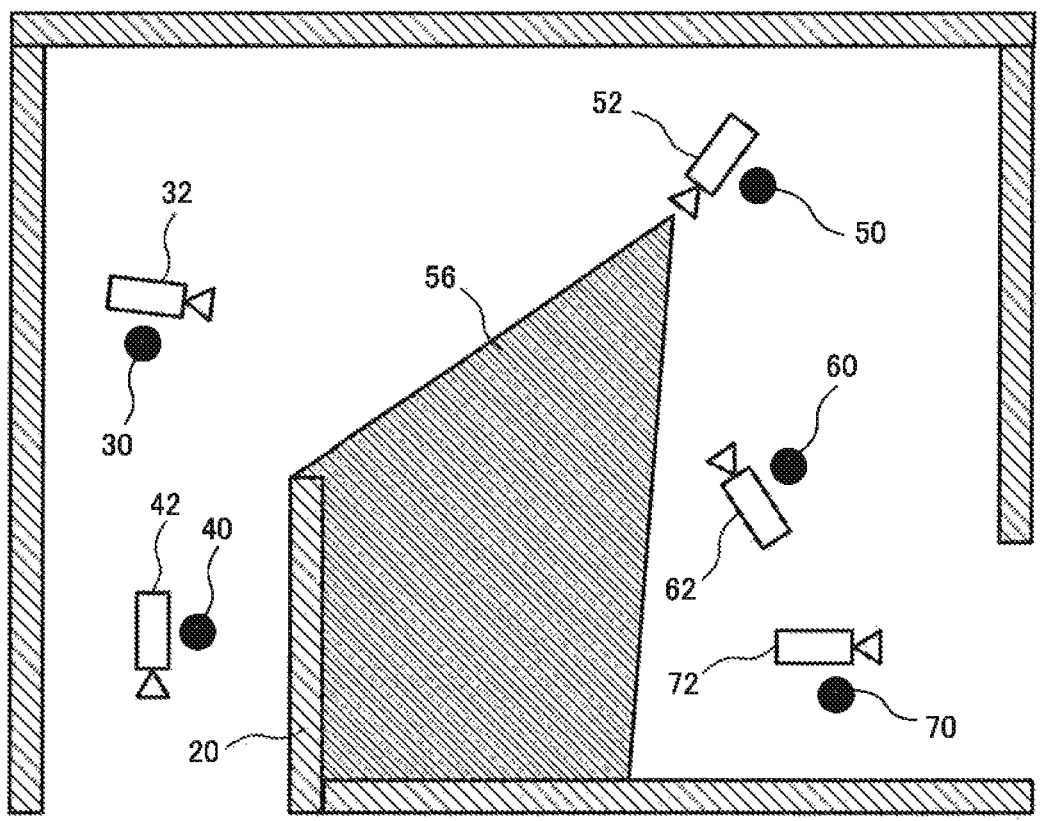
FIG. 10 is a schematic diagram of a third situation of the sensors used with the monitoring system in the first exemplary embodiment of the present invention.

Referring to FIG. 10, a third situation of the first exemplary embodiment of the present invention is disclosed. The coverage analyzer 102 identifies a camera based on map information including wall or other space defining structures. If there are walls or other space defining structures within the coverage of the sensors, the coverage analysis 202 takes into account the walls or other space defining structures. Regarding events detected by a microphone 40, the coverage analyzer 102 identifies the microphone 40 and the microphone 30 instead of the camera 52 because the view of the camera 52 is blocked by a wall 20. Since the wall or other space defining structures may have significant impact on identification of sensors, taking into account map information in coverage analysis is helpful to provide accurate information to the operators.

In another example, the coverage analyzer 102 may identify a camera based on an installed configuration of the sensors. There are various types of operator requirements. The operators may wish to obtain information concerning the surroundings of the event instead of the event itself in some situations. In such situations, the coverage analysis 202 based on the installed configuration of the sensors will be useful for the operators. The coverage analyzer 102 may determine one or more of the plurality of sensors that may capture an object or person as it/he/she moves away from an event location in response to the installed configuration of the sensors and the event related data. Also, the coverage analyzer 102 may determine one or more of the plurality of sensors that may monitor the unfolding event, the one or more of the plurality of sensors including at least one of the plurality of sensors that captures a large portion of space defined within the space defining structures of the map information.

In accordance with the first exemplary embodiment in the present invention, the monitoring system can detect and react to abnormal events in real-time. The reason is that the coverage analyzer 102 analyzes the data in accordance with a rule based algorithm method, a machine learning algorithm method and/or a geographical map based algorithm. Also, the wall or other space defining structure information may be included in the FOV information instead of map information.

The coverage analyzer 102 may further analyze the data by combining one or more algorithm methods in accordance with a Boolean formula, score results of each of one or more of the algorithm methods in response to a score of the results of each of the one or more of the algorithm methods, and/or prioritize the results of the algorithm methods in response to predetermined priorities of each of the one or more of the algorithm methods. The coverage analyzer 102 may analyze the data in accordance with the machine learning algorithm method where the machine learning algorithm method is based on an AdaBoost which considers these algorithm methods as weak learners. Further, the coverage analyzer 102 may analyze the data in accordance with a clustering algorithm in order to cluster the plurality of sensors into one or more suitable sensor clusters and one or more unsuitable sensor clusters.

The coverage analyzer 102 passes the identified sensor information to the sensor selector 104. The sensor selector 104 selects sensors and sends the selected sensor information to the sensor actuators 106. The sensor selector 104 may pass metadata such as event information to the sensor actuators 106. The sensor selector 104 may also pass a sensor list and the metadata to an application system for presentation to the operators to encourage them to monitor the selected sensors. The sensor selector 104 may also select more than one sensor. When the sensor selector 104 selects multiple sensors, the sensor selector 104 may output the list of sensors with sensor prioritization scores indicating a prioritization or ranking of optimal sensors.

The sensor actuators 106 may change sensor settings based on the information from the sensor selector 104 if necessary. To capture a regional event and observe the event closely, the sensor actuators 106 may change sensor settings by changing volume, resolution or PTZ zoom settings for optimal close up coverage of the event location. Also, to capture a wide area event and to observe the entire scene of the event, the sensor actuators 106 change sensor settings by changing volume, resolution or PTZ zoom settings for optimal wide area coverage of the event location.

Second Exemplary Embodiment

In a second exemplary embodiment of the present invention, the monitoring system does not select suitable sensors but instead list candidates for various viewings. The viewings include but are not limited to various views surrounding the event. The monitoring system captures the event area from zoom out cameras to learn what is happening around the event. Alternatively, the monitoring system captures the exit of a room when an event occurs in the room. The viewings may also include viewing the subject of the event up close. The monitoring system captures the event closely to learn the subject or cause of the event.

The coverage analyzer 102 determines one or more of the plurality of sensors that may monitor the unfolding event and outputs selection data to the sensor selector 104 including identification of the one or more of the plurality of sensors that may monitor the unfolding event.

Figure 11:
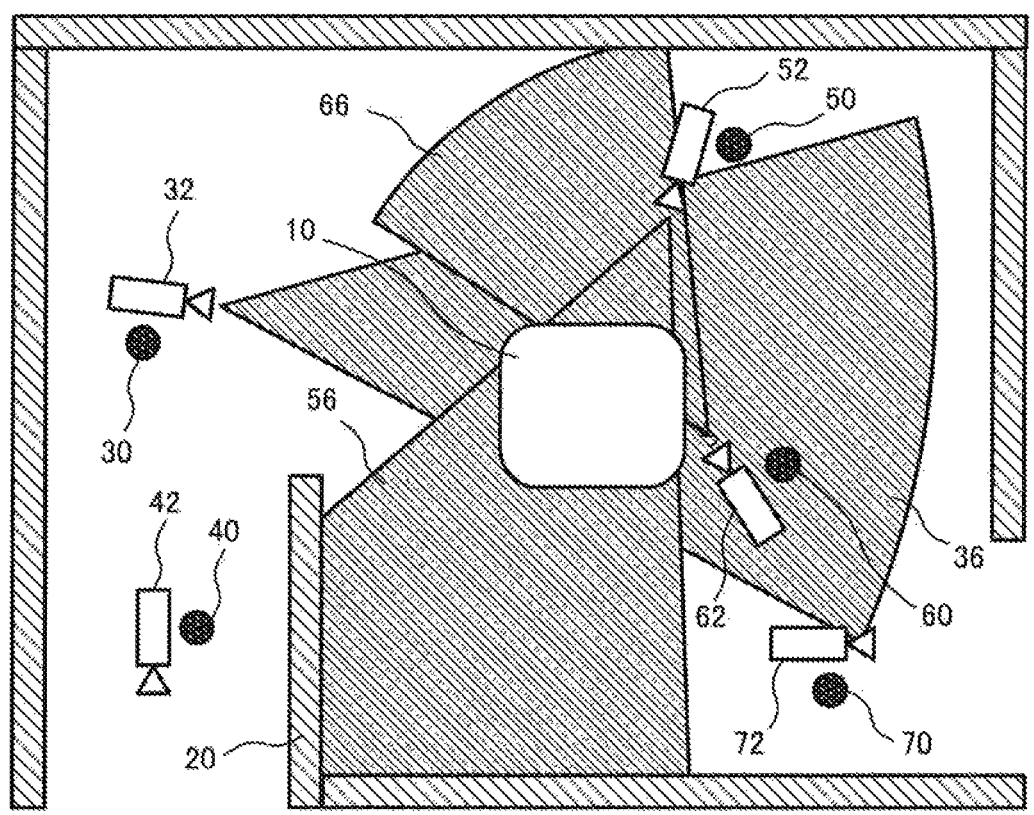
FIG. 11 is a schematic diagram of a first situation of the sensors used with the monitoring system in a second exemplary embodiment of the present invention.

Referring to FIG. 11, the coverage analyzer 102 identifies sensors for the various viewings. For example, the viewings include identifying a camera based on the FOV or FOR coverage of the event. In this example, the coverage analyzer 102 identifies the camera 32 to view the surroundings of the abnormal event location 10 as detected by the microphone 60 because the FOV of the camera 32 covers the surroundings of the abnormal event location 10. Also, the coverage analyzer 102 identifies the camera 52 to view the subject of the event detected by the microphone 60 closely because the FOV of the camera 52 covers the abnormal event location 10 and the camera 52 is closer to the abnormal event location 10 as compared with the camera 32. Therefore, the system lists cameras 32 and 52 with their viewings (e.g., close up, wide area) so that the operators may select each view based on desired viewings.

Figure 12:
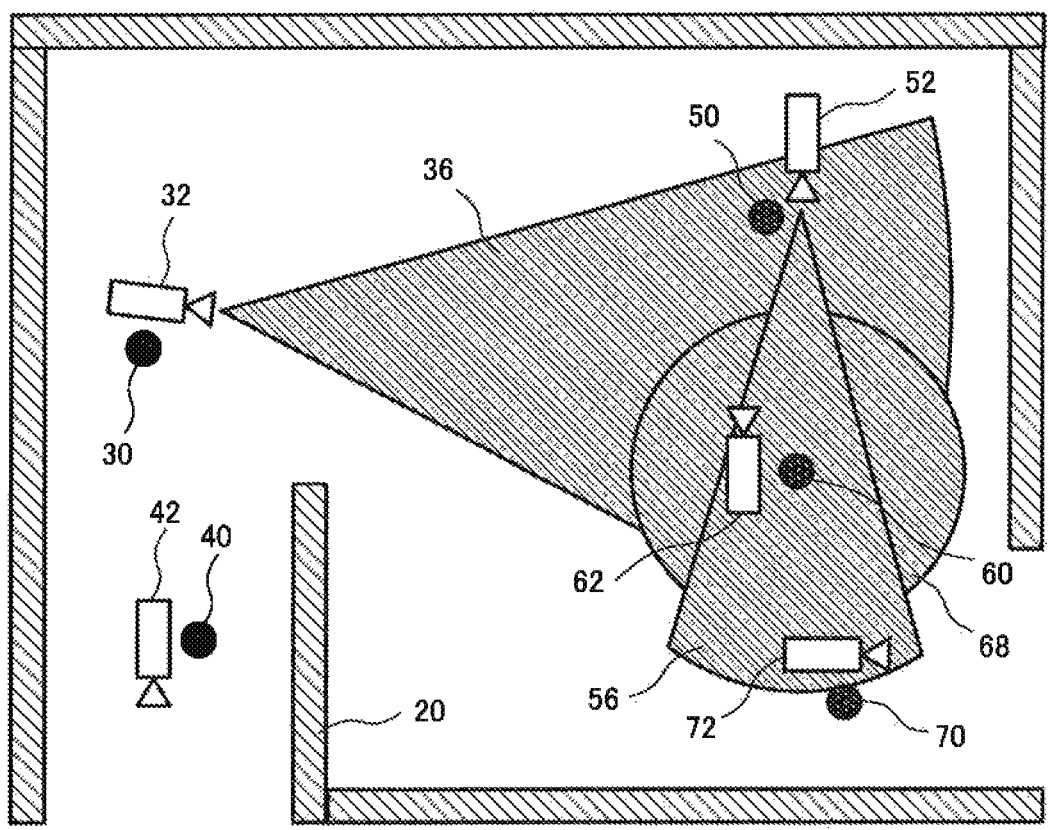
FIG. 12 is a schematic diagram of a second situation of the sensors used with the monitoring system in the second exemplary embodiment of the present invention.

Referring to FIG. 12, the viewings also include identifying the camera based on the FOV and/or the FOR coverage. In this example, the coverage analyzer 102 identifies the camera 32 to view the surroundings of the event detected by the microphone 60 because the FOV of the camera 32 has the largest FOV overlapping with the FOR of the microphone 60. Also, the coverage analyzer 102 identifies the camera 52 to view the subject of the event detected by the microphone 60 up close because the FOV of the camera 52 has overlapping coverage with the FOR of the microphone 60 and the camera 52 is close to the microphone 60. Therefore, in this example the system lists camera 32 and 52 so that operators may select each view based on desired viewings.

The coverage analyzer 102 passes the result to the sensor selector 104. The sensor selector 104 passes information to the sensor actuators 106 which includes viewing information. The sensor selector 104 may pass the sensor list and metadata to an application system which presents information to users/operators to encourage the users to monitor one or more of the selected sensors. The sensor actuators 106 may change sensor settings based on the viewing information from the sensor selector 104 if necessary. The sensor selector 104 selects one or more of the plurality of sensors in response to the selection data for operator monitoring. The selection data includes sensor prioritization scores. The sensor selector selects more than one of the plurality of sensors in response to the selection data for operator monitoring in accordance with the sensor prioritization scores. The sensor selector further outputs a list of one or more of the plurality of sensors along with corresponding sensor prioritization scores for suggested optimal operator monitoring.

In accordance with the second exemplary embodiment in the present invention, the monitoring system can detect and react to abnormal events in real-time. The reason is that operators may select each of views based on list candidates for various viewings. The viewings include but are not limited to various views surrounding the event. The system captures the event area from zoom out cameras to learn what is happening around the event.

Third Exemplary Embodiment

In a third exemplary embodiment of the present invention, the coverage analyzer 102 may use the map information for sensor coverage analysis and sensor identification. In this third exemplary embodiment, there are multiple compartments in the surveillance field and each compartment has one or more cameras and/or microphones. The sound can be detected by not only the microphone in one of the compartments but also by microphones in nearby compartments. Therefore, the system is required to identify the event location and be capable of selecting the camera in the compartment where the event occurs.

Figure 13A:
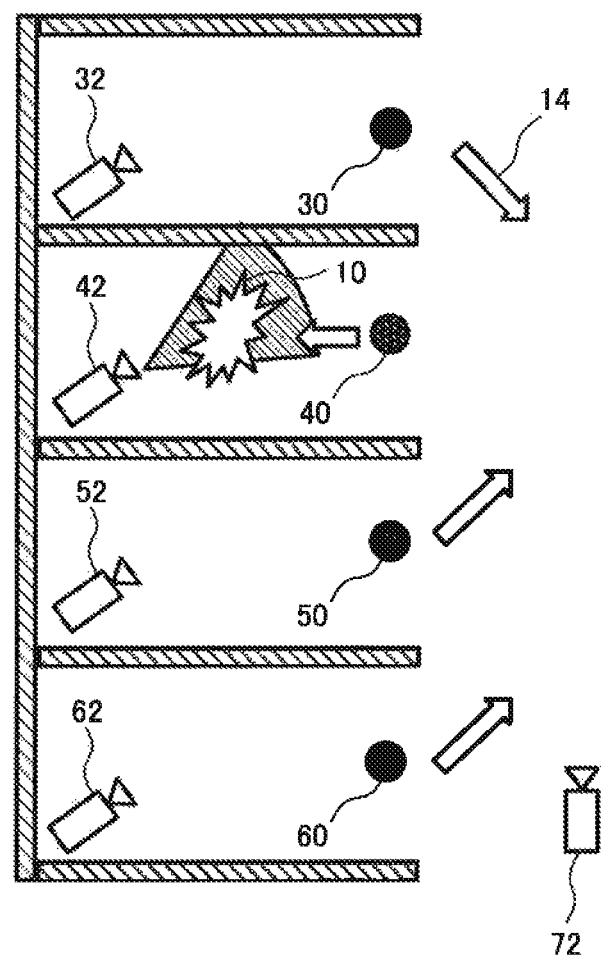
FIG. 13A is a schematic diagram of a first situation of the sensors used with the monitoring system for multiple compartments in a third exemplary embodiment of the present invention.
Figure 13B:
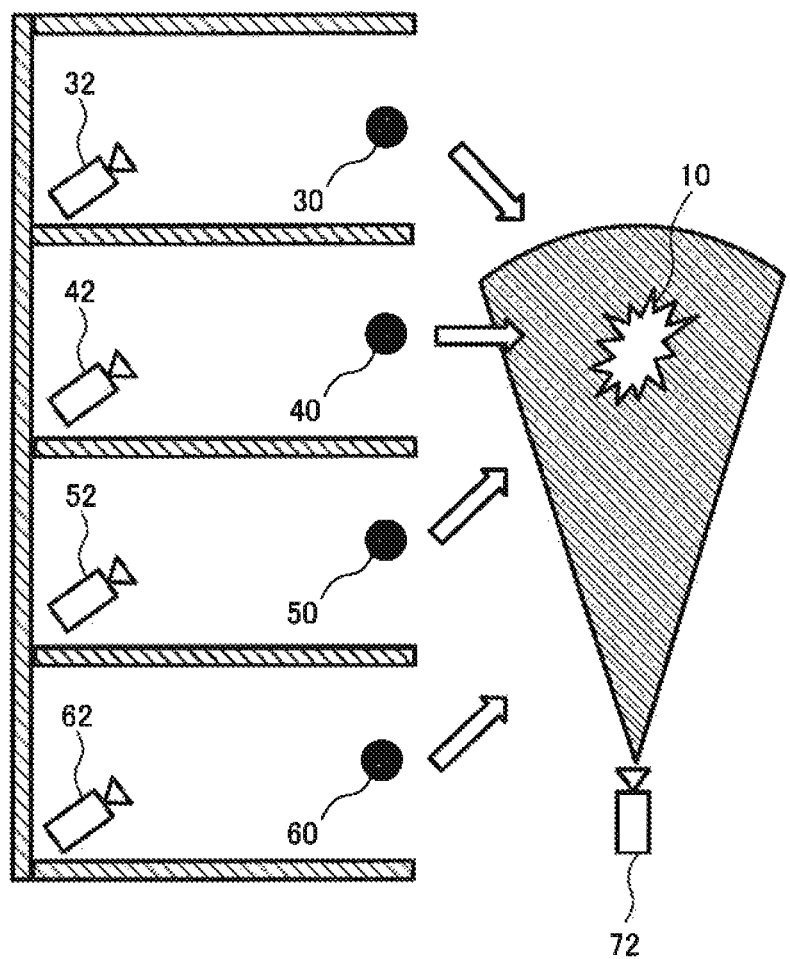
FIG. 13B is a schematic diagram of another situation of the sensors used with the monitoring system for multiple compartments in the third exemplary embodiment of the present invention.

Referring to FIG. 13A and FIG. 13B, one of the plurality of sensors is a microphone. A sensor data receiver 100 receives the event related data from the microphone including a direction of an audio input. The coverage analyzer 102 uses this direction information from multiple microphones. If the sound came from inside a compartment, then the system selects the camera in the compartment. In the FIG. 13A case, the system selects the camera 42 because the microphone 40 detected that the sound was coming from inside the compartment containing the camera 42. Furthermore, the other microphones 30, 50 and 60 detected the sound direction which can be interpreted by the coverage analyzer 102 as the sound comes from the compartment monitored by the camera 42.

On the other hand, if all sounds were from outside of the compartments, then the system selects the camera which captures the outside of the compartments. In the FIG. 13B case, the system selects the camera 72 because all the microphones 30, 40, 50 and 60 detected that the sound came from outside all of the compartments.

In accordance with the third exemplary embodiment in the present invention, the monitoring system can detect and react to abnormal events in real-time. The reason is that the coverage analyzer 102 may use the map information for sensor coverage analysis and sensor identification.

Fourth Exemplary Embodiment

Figure 14:
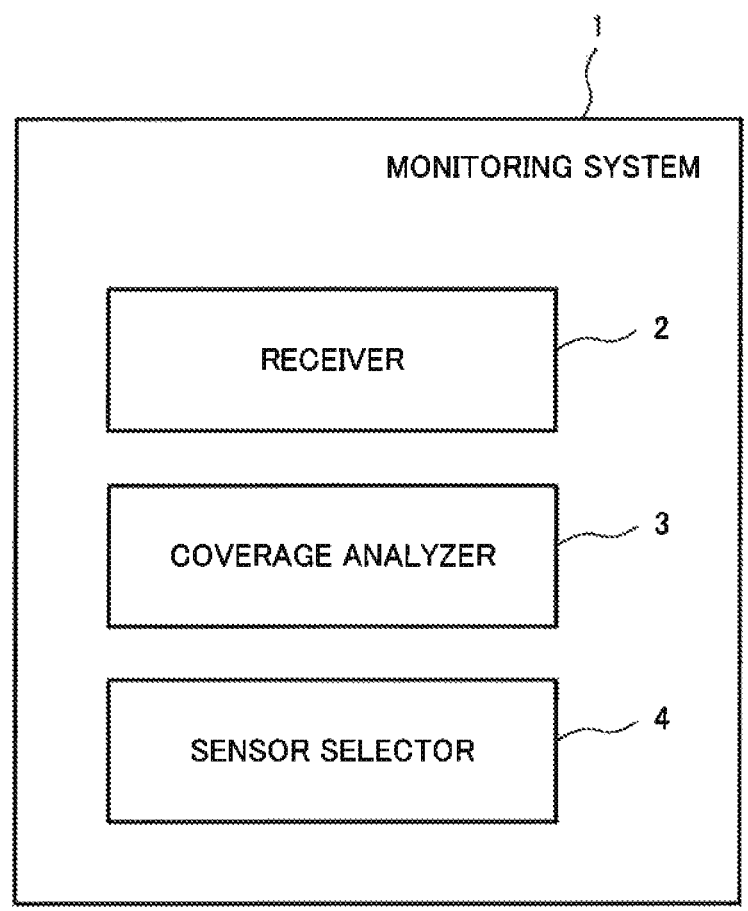
FIG. 14 is a block diagram of a monitoring system in a fourth exemplary embodiment of the present invention.

A monitoring system 1 in a fourth exemplary embodiment of the present invention is described by referring to FIG. 14. The monitoring system 1 of the fourth exemplary embodiment includes a receiver 2, a coverage analyzer 3 and a sensor selector 4.

The receiver 2 receives the event related data from a plurality of sensors. The coverage analyzer 3 analyses predetermined data and the event related data from the receiver, the predetermined data including map information and sensor coverage information. The sensor selector 4 is coupled to the coverage analyzer 3 and selects one or more of the plurality of sensors based on the analysis by the coverage analyzer 3.

In accordance with the fourth exemplary embodiment in the present invention, the monitoring system 1 can detect and react to abnormal events in real-time. The reason is that the coverage analyzer 3 analyzes predetermined data and the event related data from selectable receivers to show details of events including desired views.

It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing an exemplary embodiment of the invention, it being understood that various changes may be made in the function and arrangement of elements and method of fabrication described in an exemplary embodiment without departing from the scope of the invention as set forth in the appended claims.

Figure 15:
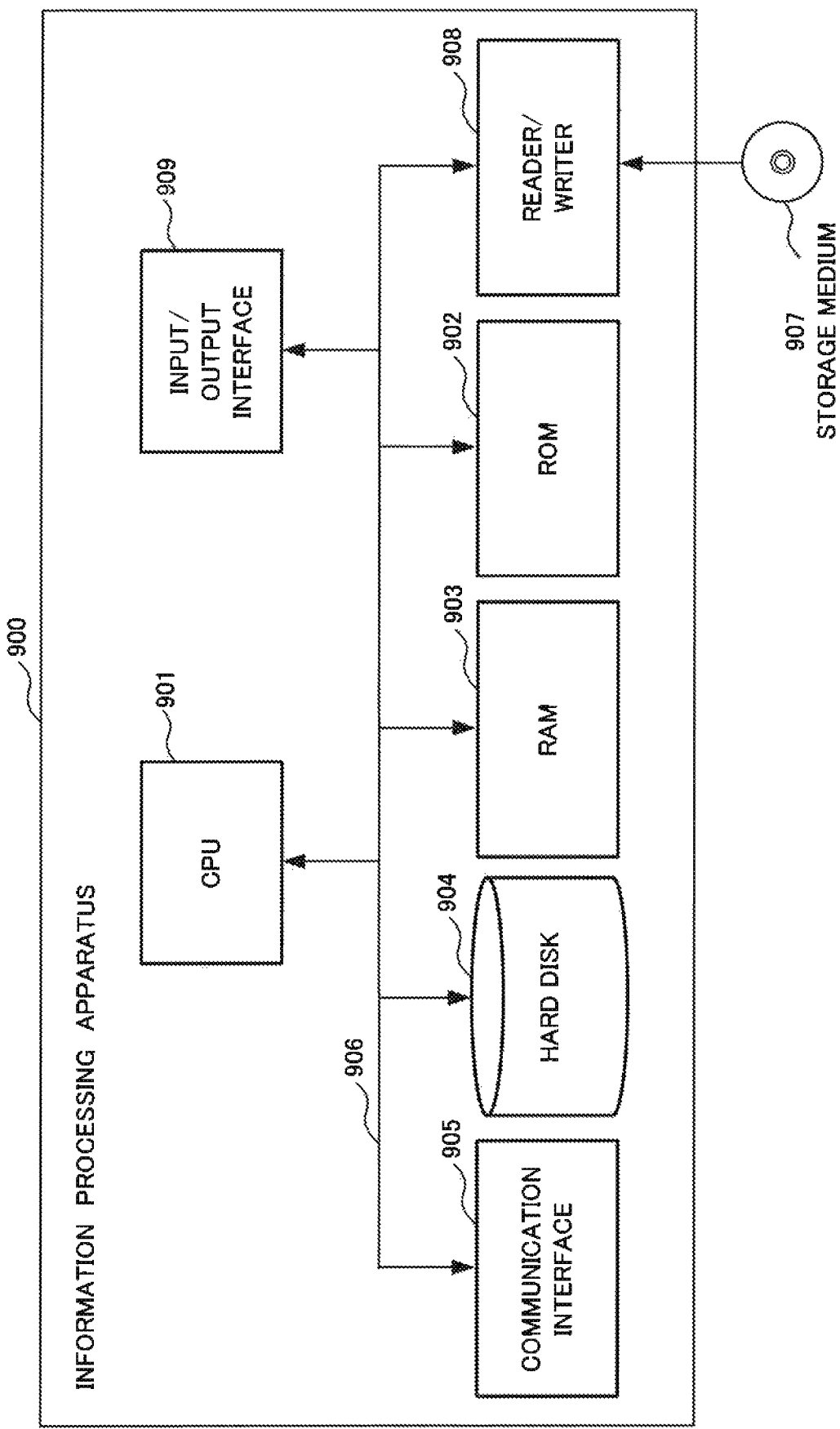
FIG. 15 is a block diagram of an information processing apparatus to realize monitoring systems in exemplary embodiments of the present invention.

FIG. 15 illustrates, by way of example, a configuration of an information processing apparatus 900 (computer) which can implement a monitoring system relevant to an exemplary embodiment of the present invention. In other words, FIG. 15 illustrates a configuration of a computer (information processing apparatus) capable of implementing the system in FIGS. 2, 7-13B, representing a hardware environment where the individual functions in the above-described exemplary embodiments can be implemented.

The information processing apparatus 900 illustrated in FIG. 15 includes the following as components:

CPU 901 (Central_Processing_Unit);
ROM 902 (Read_Only_Memory);
RAM 903 (Random_Access_Memory);
Hard disk 904 (storage device);
Communication interface to an external device 905 (Interface: hereinafter called "I/F");
Reader/writer 908 capable of reading and writing data stored in a storage medium 907 such as CD-ROM (Compact_Disc_Read_Only_Memory); and
Input/output interface 909.

The information processing apparatus 900 is a general computer where these components are connected via a bus 906 (communication line).

The present invention explained with the above-described exemplary embodiments as examples is accomplished by providing the information processing apparatus 900 illustrated in FIG. 15 with a computer program which is capable of implementing the functions illustrated in the block diagrams (FIGS. 3,5,14) or the flowcharts (FIGS. 3,5) referenced in the explanation of these embodiments, and then by reading the computer program into the CPU 901 in such hardware, interpreting it, and executing it. The computer program provided to the apparatus can be stored in a volatile readable and writable storage memory (RAM 903) or in a non-volatile storage device such as the hard disk 904.

In addition, in the case described above, general procedures can now be used to provide the computer program to such hardware. These procedures include, for example, installing the computer program into the apparatus via any of various storage media 907 such as CD-ROM, or downloading it from an external source via communication lines such as the Internet. In these cases, the present invention can be seen as being composed of codes forming such computer program or being composed of the storage medium 907 storing the codes.

This application is based upon and claims the benefit of priority from Singapore Patent Application No. 201407100-0, filed on Oct. 30, 2014, the disclosure of which is incorporated herein in its entirety by reference.

The previous description of the embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further, it is noted that the inventor's intent is to retain all equivalents of the claimed invention even if the claims are amended during prosecution.

REFERENCE SIGNS LIST

10 Abnormal event location
12 Event area
14 Direction of sound
20 Wall
30 Microphone
32 Camera
34 Image by Camera 32
36 Field of View of Camera 32
40 Microphone
42 Camera
44 Field of View of Camera 42
46 Image by Camera 42
50 Microphone
52 Camera
56 Field of View of Camera 52
60 Microphone
62 Camera
66 Field of View of Camera 62
68 Field of Regarding of Microphone 60
70 Microphone
72 Camera
100 Sensor data receiver
102 Coverage analyzer
104 Sensor selector
106 Sensor actuator
108 Data analyzer
200 Sensor data receive
202 Coverage analysis
204 Sensor selection
206 Sensor actuation
208 Data analysis

The invention claimed is:

1. A method of surveillance executed by at least one computer, comprising:
   detecting an event from data received from a first sensor among a plurality of sensors;
   determining a position and a size of the event from data received from one or more of the plurality of sensors;
   receiving a sensing range of the first sensor;
   when the determined size of the event exceeds the sensing range of the first sensor, determining a second sensor in which the determined position and size of the event are within a sensing range of the second sensor, the second sensor being different from the first sensor; and
   activating the second sensor to receive data from the second sensor.

2. The method of surveillance according to claim 1, wherein the sensing range includes zone information, and the method of surveillance further comprises determining the second sensor based on the zone information.

3. The method of surveillance according to claim 1, wherein the first sensor includes a directional fixed sensor.

4. The method of surveillance according to claim 1, wherein the second sensor includes a camera.

5. The method of surveillance according to claim 4, further comprising
   controlling pan-tilt-zoom of the camera based on the position of the event.

6. A device of surveillance comprising:
   at least one memory storing a set of instructions; and
   at least one processor configured to execute the set of instructions to:
      detect an event from data received from a first sensor among a plurality of sensors;
      determine a position and a size of the event from data received from one or more of the plurality of sensors;
      receive a sensing range of the first sensor;
      when the determined size of the event exceeds the sensing range of the first sensor,
      determine a second sensor in which the determined position and size of the event are within a sensing range of the second sensor, the second sensor being different from the first sensor; and
      activate the second sensor to receive data from the second sensor.

7. The device of surveillance according to claim 6, wherein the sensing range includes zone information, and the at least one processor is further configured to determine the second sensor based on the zone information.

8. The device of surveillance according to claim 6, wherein the first sensor includes a directional fixed sensor.

9. The device of surveillance according to claim 6, wherein the second sensor includes a camera.

10. The device of surveillance according to claim 9, wherein the at least one processor is further configured to
    control pan-tilt-zoom of the camera based on the position of the event.

11. A non-transitory computer-readable storage medium storing a program causing a computer to execute processing of:
    detecting an event from data received from a first sensor among a plurality of sensors;
    determining a position and a size of the event from data received from one or more of the plurality of sensors;
    receiving a sensing range of the first sensor;
    when the determined size of the event exceeds the sensing range of the first sensor, determining a second sensor in which the determined position and size of the event are within a sensing range of the second sensor, the second sensor being different from the first sensor; and
    activating the second sensor to receive data from the second sensor.

12. The non-transitory computer-readable storage medium according to claim 11,
    wherein the sensing range includes zone information, and the program further causes the computer to execute processing of determining the second sensor based on the zone information.

13. The non-transitory computer-readable storage medium according to claim 11,
    wherein the first sensor includes a directional fixed sensor.

14. The non-transitory computer-readable storage medium according to claim 11,
    wherein the second sensor includes a camera.

15. The non-transitory computer-readable storage medium according to claim 14, wherein the program further causes the computer to execute processing of controlling pan-tilt-zoom of the camera based on the position of the event.

16. The method of surveillance according to claim 1, wherein the second sensor includes a camera, and wherein the method further comprises:
   controlling a zoom of the camera of the second sensor based on the determined position and the size of the event detected by the first sensor; and
   controlling a display to display at least one of a listing, including the camera, and an image from the camera of the second sensor in response to determining the second sensor based on the sensing range and the position of the event.

17. The method of surveillance according to claim 1, wherein the detecting the event comprises detecting a type of the event from a plurality of types of events at least one of which indicating an abandoned object and at least one other of which indicating congestion of an area.

18. The device of surveillance according to claim 6, wherein the second sensor includes a camera, and wherein the at least one processor is further configured to execute the set of instructions to:
   control a zoom of the camera of the second sensor based on the determined position and the size of the event detected by the first sensor; and
   control a display to display at least one of a listing, including the camera, and an image from the camera of the second sensor in response to determining the second sensor based on the sensing range and the position of the event.

19. The device of surveillance according to claim 6, wherein the detecting the event comprises detecting a type of the event from a plurality of types of events at least one of which indicating an abandoned object and at least one other of which indicating congestion of an area.

20. The non-transitory computer-readable storage medium according to claim 11,
   wherein the second sensor includes a camera, and
   wherein the program further causes the computer to execute processing of controlling a zoom of the camera of the second sensor based on the determined position and the size of the event detected by the first sensor, and
   wherein the program further causes the computer to execute processing of controlling a display to display at least one of a listing, including the camera, and an image from the camera of the second sensor in response to determining the second sensor based on the sensing range and the position of the event.

\* \* \* \* \*